UNITED STATES PATENT OFFICE.

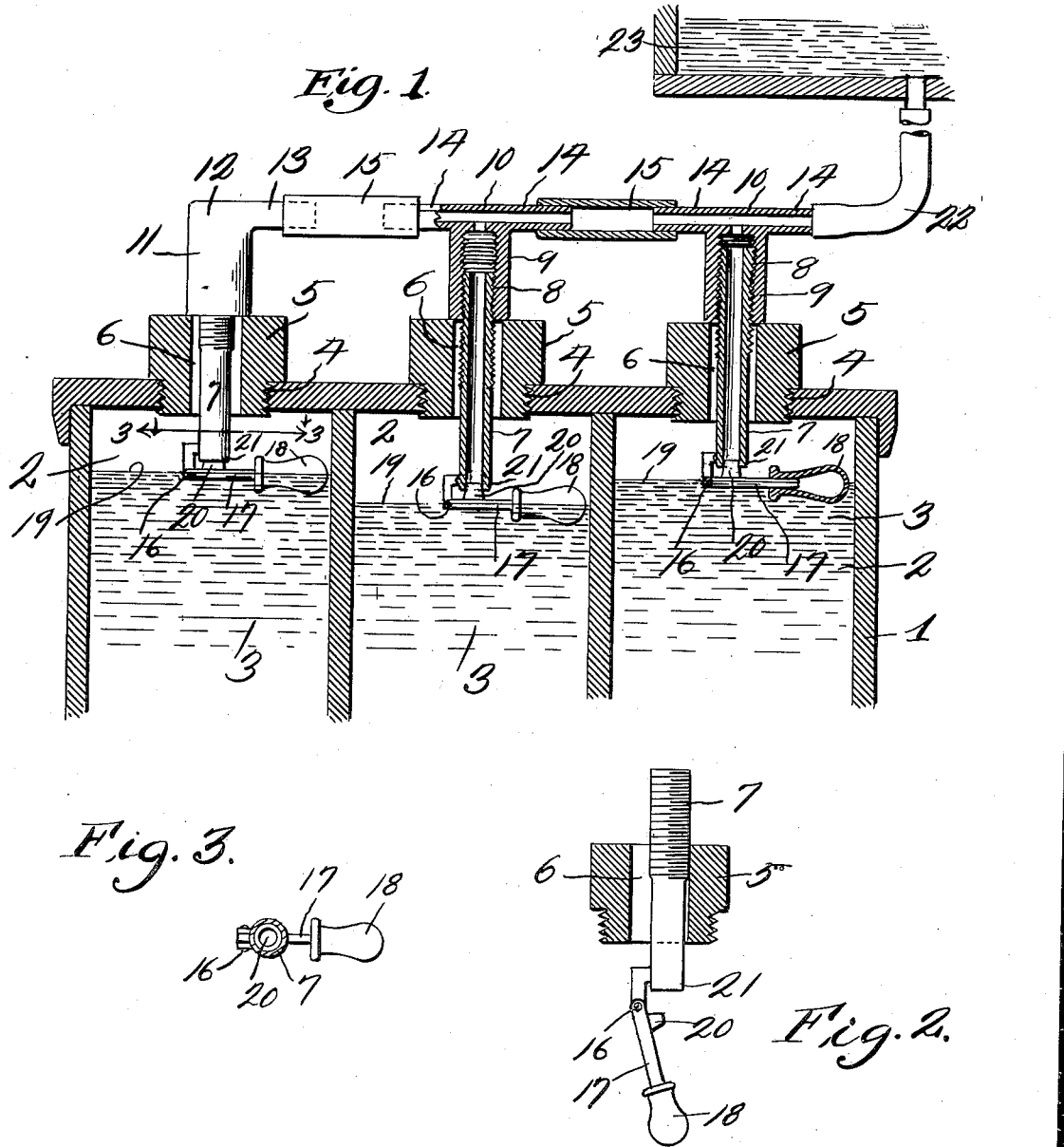

DAVID A. LAWSON, OF SOUTH BEND, INDIANA.

BATTERY-WATERING DEVICE.

1,403,041.                Specification of Letters Patent.   Patented Jan. 10, 1922.

Application filed August 24, 1921. Serial No. 494,918.

*To all whom it may concern:*

Be it known that I, DAVID A. LAWSON, a citizen of the United States, residing at South Bend, in the county of St. Joseph and State of Indiana, have invented certain new and useful Improvements in Battery-Watering Devices, of which the following is a specification.

The invention relates to watering devices for electric batteries, and has for its object to provide a float controlled battery watering device wherein vertically disposed and adjustable nipples having valve seats in their lower ends are disposed in caps threaded in the threaded filling openings of the battery, said nipples having pivoted to their lower ends arms provided with floats and with valves cooperating with the valve seats in the lower ends of the nipples for supplying fluid to the batteries when the fluid level drops below a predetermined point. Also to construct the threaded caps and the threaded adjustable nipples in such a manner that the nipples and the float arm and float may be removed from the batteries through the caps, thereby allowing the attachment to be easily and quickly applied to batteries at present in use, wherein threaded filling openings are provided.

A further object is to provide fittings threaded on the upper ends of the nipples, which fittings are connected together by pliable connections which will allow independent adjustment or movement of the fittings in relation to each other during an adjusting operation of the nipples, or the removal of one of the nipples without disturbing the other.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a vertical sectional view through the upper end of a conventional form of wet battery, showing the water controlling device applied thereto, and partially in section.

Figure 2 is a detail sectional view through one of the filling opening caps, showing the nipple and float being removed through one of the caps.

Figure 3 is a horizontal sectional view taken on line 3—3 of Figure 1.

Referring to the drawing, the numeral 1 designates a conventional form of battery, which battery is provided with compartments 2 in which water 3 is fed from time to time to replenish the supply within the compartments. The battery 1 is a conventional form and the device hereinafter described is designed to be applied to batteries at present in use. Batteries at present in use are provided with threaded filling openings 4, which openings are normally closed by caps. When applying the watering device to the battery, said caps are removed and caps 5 screwed into the filling openings. The caps 5 are provided with centrally disposed apertures 6 of substantially greater diameter than the vertically adjustable threaded nipples 7, which extend through the apertures 6 and have their upper ends threaded at 8 into the vertical portions 9 of T's 10, and the vertical portion 11 of an L 12. The horizontal portion 13 of the L 12 and the horizontal arms 14 of the T's 10 are in substantial alignment and have their adjacent ends connected together by means of pliable connecting pipes 15 which are easily detachable and preferably formed from rubber, thereby allowing any one of the T's to be removed without materially disturbing the other T or L. Pivotally connected at 16 to the lower end of the nipples 7, are arms 17, the free ends of which are provided with floats 18 adapted to rest on the surfaces 19 of the water 3 within the battery. The arms 17 are provided with valves 20 which valves cooperate with valve seats 21 in the lower ends of the nipples 7. It will be seen that when the level 19 in any one of the compartments 2 of the battery falls, that the valve 20 will be unseated from its valve seat 21, thereby allowing fluid to flow into the particular compartment 2 through the nipple 7, T 10. pipe 22 from the supply tank 23, which may be located in any suitable place, however preferably at a point above the battery thereby allowing a gravity feed.

When it is desired to have access to one of the chambers 2, it will be seen that it will only be necessary to disconnect the pliable pipes 15 from the arms 14 of the T 10 which rests on the upper end of the cap 5, then raise said T upwardly, which action will allow the float to assume a position shown in Figure 2, and a continued upward movement of the T 10 and the nipple 7 carried thereby will cause said nipple and float to be entirely removed from the compartment 2 through the aperture 6 in the cap 5 without moving said cap from its position. The lower ends of the vertical portions 9 of the T's 10 rest upon the upper faces of the caps 5 and normally close the apertures 6 for excluding foreign matter. The lower end of the vertical portion 11 of the L 12 rests upon the upper face of one of the caps 5 and closes the upper end of the aperture 6 in a similar manner to the vertical portions 9 of the T's 10. It will be seen that when it is desired to adjust the device for maintaining a constant level of fluid at a predetermined level, it will only be necessary to rotate one of the nipples 9 for adjusting the same vertically, or rotate the T which carries the same, and in this manner an accurate and quick adjustment may be obtained. It will also be noted that a watering device is so constructed that it may be easily and quickly applied to the filling openings of batteries at present in use without modifying or changing their construction.

The invention having been set forth what is claimed as new and useful is:—

1. The combination with a battery having a plurality of cells therein containing fluid and having threaded filling openings above said cells, of means for maintaining a constant fluid level in said cells, said means comprising caps threaded in said threaded filling openings and provided with vertically disposed apertures, vertically disposed nipples extending through the apertures of the caps, float arms having floats, said arms being disposed within the cells and pivotally connected to the lower ends of the nipples and controlling valves cooperating with valve seats on the lower ends of the nipples, said apertures in the threaded caps and the float arms and floats being so proportioned that the float arms and floats will pass through the apertures of the threaded caps on an upward movement of the nipples.

2. The combination with a battery having a cell therein and a threaded filling opening, of means for supplying fluid to said cell, said means comprising a cap threaded in the filling opening, a nipple extending through the aperture of said threaded cap and vertically adjustable, a float arm having a float, said float arm being pivotally connected to the lower end of the nipple and controlling a valve cooperating with a valve seat carried by the nipple, said float arm and float being so proportioned that it may pass upwardly through the aperture in the threaded cap and means for supplying a constant flow of water to the nipple.

In testimony whereof I affix my signature.

DAVID A. LAWSON.